United States Patent [19]

Munter

[11] 4,123,626

[45] Oct. 31, 1978

[54] DIGITAL ECHO ATTENUATION CIRCUIT FOR A TELEPHONE SYSTEM

[75] Inventor: Ernst A. Munter, Ottawa, Canada

[73] Assignee: Northern Telecom Limited, Montreal, Canada

[21] Appl. No.: 854,118

[22] Filed: Nov. 23, 1977

[51] Int. Cl.² .............................................. H04B 3/20
[52] U.S. Cl. .................................. 179/170.2; 179/170.6
[58] Field of Search ............... 179/170.2, 170.6, 170.8, 179/1 HF

[56] References Cited

U.S. PATENT DOCUMENTS

| | | | |
|---|---|---|---|
| 3,673,355 | 6/1972 | La Marche et al. | 179/170.6 |
| 3,896,273 | 7/1975 | Fariello | 179/170.6 |
| 3,906,172 | 9/1975 | Hoeschele, Jr. et al. | 179/170.6 |
| 3,937,907 | 2/1976 | Campanella et al. | 179/170.2 |
| 4,051,332 | 9/1977 | Izumi et al. | 179/170.2 |

Primary Examiner—Kathleen H. Claffy
Assistant Examiner—Randall P. Myers
Attorney, Agent, or Firm—John E. Mowle

[57] ABSTRACT

A digital echo attenuation circuit for a two-wire-four-wire local telephone circuit in which each digital sample of the transmit and receive signals is compared directly and the results used to augment an accumulator. Once the accumulator reaches a certain threshold level, its output controls a digital pad to attenuate the receive signal and thereby prevent severe distortion and near singing effects.

8 Claims, 1 Drawing Figure

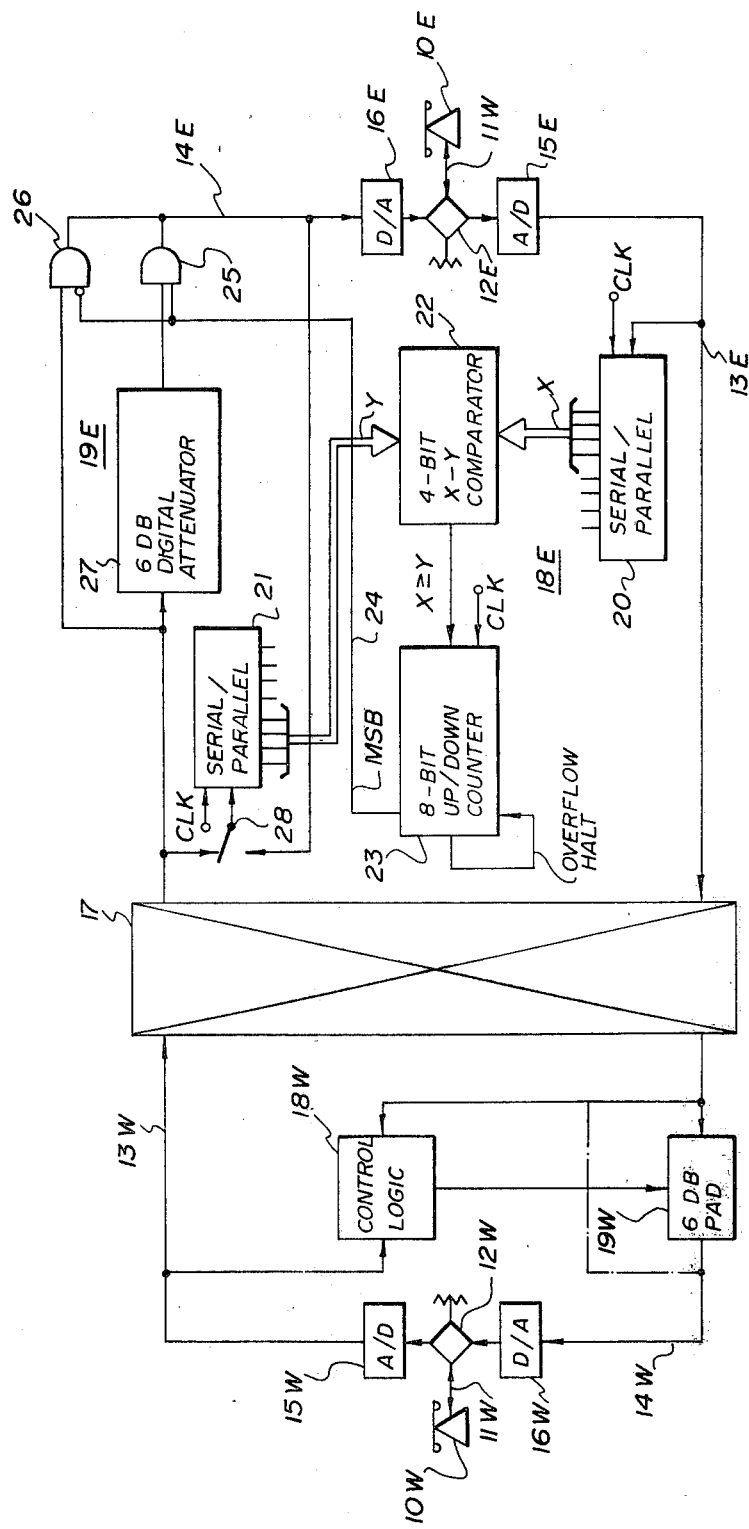

DIGITAL ECHO ATTENUATION CIRCUIT FOR A TELEPHONE SYSTEM

This invention relates to a digital echo attenuation circuit for a two-wire-four-wire telephone circuit and more particularly to one which is particularly adapted for preventing severe distortion or near singing effects during a local telephone call.

BACKGROUND OF THE INVENTION

Analog echo suppressors utilizing voice switching techniques have long been used in telephone systems to improve the quality of long-distance calls for which the two-way signal delay is such as to result in annoying echos being propagated around the loop. More recently, with the advent of digital transmission, it has been necessary to develop digital echo suppressors to perform the same function. An example of this is found in U.S. Pat. No. 3,673,355 entitled "Common Control Digital Echo Suppression" issued June 27, 1972 and invented by R. E. LaMarche et al. Here, digitized signals representative of the peak amplitude of each of the transmit and receive signals are separately stored. The stored signals are periodically updated as the magnitude of the peak signals increases or decreases. A periodic comparison is made to determine the relative magnitude of the digitized signals. Upon detection that the received signal exceeds a certain threshold, digital attenuation of the transmit signal is effected to provide echo suppression. Additional circuitry is also provided to insert sufficient attenuation in the receive path during a double talking condition to reduce the echos to a tolerable level.

In a two-wire circuit for analog transmission of a local telephone call, echo suppression is not necessary since the signal delay is relatively short and no major impedance mismatch occurs which would give rise to signal reflections. With digital switching of local calls, the analog signals from the station set are converted to a digital format prior to switching in a central office (CO) or a private branch exchange (PBX). However, digital signals cannot be readily transmitted and received on a two-wire line. Hence, the analog signals from the telephone set are initially split prior to encoding and decoding, into a four-wire circuit utilizing a so-called hybrid network. Because it is not economically feasible to prevent all leakage across the hybrid network, some of the received signal from the decoder (D/A converter) is coupled through the hybrid network to the encoder (A/D converter) in the transmit path. If the phase delay around the four-wire path is such that the leakage signal reinforces or cancels the incoming signal from the telephone set at some frequency in the frequency range transmitted, severe distortion and even oscillation can result.

One possible solution to this dilemma is to insert fixed attenuation in either the digital or analog portions of the four-wire circuit. While such a solution is acceptable for long distance or toll calls, it is not tolerated in a local call. Thus, it is necessary that substantially zero loss be encountered over the talking path of two telephones on a local call. Hence the only practical solution is to insert sufficient attenuation in the listening path to substantially negate any severe distortion or oscillation. Such attenuation can be inserted in the listening path at either the transmit or receive ends and must be switched in and out in response to the relative signal levels of the two paths. This can be done in either the digital or analog portions of the four-wire path. However because the attenuation must be applied to each four-wire circuit, prior circuits such as discussed above for providing echo suppression in long distance calls encountering lengthy transmission delays, are not economically feasible for application to each local call due to the complexity of the circuitry required to control the attenuators.

STATEMENT OF THE INVENTION

It has been found that a relatively simple yet effective form of control circuit for a digital attenuator can be readily implemented by direct comparison of each of the sampled digital signals, the results of which are fed to an accumulator or up/down counter, the output of which is used to control an attenuator in each listening path.

Since at every sampling point the instantaneous magnitudes of the samples are compared, the result of the comparison may reverse back and forth. However, over an extended number of samples the signal having the larger average amplitude will cause the accumulator to progress towards its upper or lower limit. The basic algorithm of the accumulator is defined as follows:

$$A(n) = A(n - 1) + (|x| - |y|)$$

where:
$A(n)$ = present value of the accumulator,
$A(n - 1)$ = past value of the accumulator,
$|x|$ = magnitude code of the transmit digital signal,
$|y|$ = magnitude code of the receive digital signal.

It will be evident that both $x$ and $y$ can be truncated to less than the full number of sample bits and that the value $(|x| - |y|)$ can be truncated even further. Typically, the accumulator is an up/down counter having L stages and both overflow and underflow prevention. Therefore, $A(n)$ is bounded by 0 and $A(max) = (2^L - 1)$. The threshold level T is the value of the accumulator when the attenuator is switched in, thus:

Typically:
$0 < T < (2^L - 1)$
$A(n) \geq T$ — Attenuator in
$A(n) < T$ — Attenuator bypassed
$|x| =$ 4 out of 7 bits
$|y| =$ 4 out of 7 bits
$(|x| - |y|) =$ 1 out of 4 bits
$L =$ 8
$(2^L - 1) =$ 255
$T \geq 2^{(L-1)} \geq$ 128. In this case, because only one bit is used in updating the accumulator, the equation for the algorithm is modified to:
$A(n) = A(n - 1) + 2(|x| - |y|) - 1$
with $(|x| - |y|) = 1$ if $x \geq y$
$(|x| - |y|) = 0$ if $x < y$.

In one particular embodiment, the digital output rather than the input of the attenuator is fed into the comparator, so as to provide a hysteresis between the switching of the two attenuator pads at opposed ends of the four-wire loop. As a result, once an attenuator is inserted in the listening path, the signal being fed to the comparator from it will have an inherent loss relative to that of the talking path thereby affecting the transition back to the unattenuated state should one party attempt to interrupt the other.

Also encompassed is a method of attenuating echos in a telephone system having a two-wire analog path coupled to a four-wire digital path, which comprises: comparing at least some of the most significant bits of each digitally encoded sample of transmit and receive signals in the four-wire digital path to derive an output representative of the difference therebetween; integrating at least some of the output to a maximum or minimum limit; and attenuating the signal in the listening direction of the four-wire path whenever the integrated level exceeds a selected threshold.

BRIEF DESCRIPTION OF THE DRAWING

An example embodiment of the invention will now be described with reference to the accompanying drawing which illustrates the schematic block diagram of a digital echo attentuation circuit in a telephone system.

DESCRIPTION OF THE PREFERRED EMBODIMENT

With reference to the following detailed description, the accompanying schematic is divided into east and west terminals with like elements having the same reference numerals followed by reference characters E or W to designate the appropriate location. Only the reference numeral will be referred to unless specific reference to one or the other is required. Also, both terminals are basically the same. Hence only the east terminal is shown in detail.

Each of the east-west station terminals comprises a telephone set 10 connected via a two-wire transmission path 11 to a hybrid network 12. Analog transmit and receive signals are coupled from the network 12 to a digital transmit 13 and a receive 14 four-wire transmission path via analog-digital (A/D) 15 and digital-analog (D/A) 16 converters. The converters 15 and 16 are in turn coupled to a digital switching system 17. It will be evident that the switching system 17 may be a local PBX, one or more central offices connected in tandem via inter-office trunks, or any combination of these. In addition, one of the two central switching offices may operate on two-wire analog signals in which case the signals will be converted from digital to analog at the output of the other office.

Each of the voice controlled digital echo attenuation circuits comprises a control logic circuit generally 18, which controls the insertion of a 6dB attenuator pad generally 19, in the receive path in response to the relative magnitude of the transmit and receive signals. When the input to the circuit 18 is prior to the 6dB pad 19 in the receive path, each of the two control logic circuits 18 receive information of the same relative magnitude for comparison purposes. Consequently, there will be a minimum amount of hysteresis or overlap between the insertion of one digital pad (say 19E) and the removal of the other (19W). However, when the signal sample in the receive path 14 is obtained after the pad 19, the one attenuator pad (say 19E) will be inserted well before the removal of the other (19W), so as to provide a greater hysteresis around the loop.

In the following description, a standard PCM format for transmission of voice signals will be assumed in which an 8-bit code comprising a single polarity or sign bit and seven magnitude bits are used to transmit a voice signal sampled at an 8 KHz rate. The analog signals are encoded using a μ-255 or A-law so that the binary value of the magnitude bits is roughly proportional to the logarithm of the encoded signal amplitude. Both digital signals on the transmit and receive paths 13 and 14 are coupled to separate serial-to parallel converters 20 and 21 respectively. During each sample, the $n = 4$ most-significant bits of the $m = 7$ magnitude bits from the output of each of the converters 20 and 21 are fed to an 8 KHz rate or every 125 μsec to a four-bit x-y comparator 22. When the transmit signal $x$ is equal to or greater than the receive signal $y$, an output will be obtained from the comparator 22 which increments an $L = 8$-bit up/down counter or accumulator 23 by one. On the other hand, when the receive signal $y$ is greater than the transmit signal $x$, the counter is decremented by one. The counter 23 includes a conditional overflow halt control which prevents the counter from recycling once it is filled or empty. The contents of the counter 23 therefore can vary anywhere between 0 and a maximum of $(2^L - 1) = 2^8 - 1 = 255$.

When the counter is more than half-full, i.e. $A(n) \geq 128$, an output is obtained on the most-significant bit lead 24 which opens and closes AND gates 25 and 26 respectively so as to connect a 6dB digital attenuator 27 in series with the receive path 14. Comparing only the four most-significant bits results in an output $x = y$ from the comparator 22 for small amplitude differences of less than about 3dB. As a result the counter 23 at both east and west terminals is continually being incremented during no signal periods. This biases the control logic 18 so that both pads 19 tend to remain in the four-wire path except when a signal is present on one of the receive paths 14.

In the above-described embodiment, various units are synchronized by a recovered clock signal (CLK) in a well known manner. In addition, the output of each of the serial-to-parallel converters 20 and 21 is truncated so that only the four out of seven most-significant bits are compared in the comparator 22. In addition, the output of the comparator 22 is also truncated so that the counter 23 is only augmented up or down a single bit after each comparison. It will be evident that various other configurations could be utilized and that the amount of delay encountered in switching the pads 19 in and out can be readily altered by changing the capacity and/or threshold point of the counter 23. In addition, it has been found that 6dB attenuation of the digital signals in the attenuators 27 provides sufficent margin to prevent severe distortion of the signals being propagated around the four-wire path without noticeably affecting the level of the listening path. Consequently, should a double-talking condition occur, both parties will hear the other without undue attenuation even though one or possibly both of the 6dB attenuator pads 19 are in.

As illustrated, the received digital signal fed to the serial-to-parallel converter 21 is obtained prior to the attenuator 27. If a more pronounced hysteresis or overlap between the insertion of one pad (say 19E) and the removal of the other (19W) is required, the input to the serial-to-parallel converter 21 can be obtained from the output of AND gates 25 and 26 by altering the position of switch 28. As a result, once the pad 27 is in the circuit, the $y$ signals will be automatically attenuated by 6dB thereby tending to retain the attenuator 27 in the receive path 14E until a strong signal is received from telephone 10W.

The embodiment described above utilizes a single control logic circuit 18 per line. It will be evident that as with many digital transmission systems, some of the circuitry can be used on a time-shared basis. For instance, if a PCM signal utilizing the standard 24 channel T1 format (see Transmission Systems For Communication by Bell Telephone Laboratories, Inc. Fourth Edition, pp. 556 et seq.) were transmitted and received along the four-wire path the control logic could be readily arranged by the use of additional storage, memory and recall circuitry to sequentially insert or remove the 6dB pads 19 from the line depending upon the various conditions in each of the 24 channels. The circuit can be readily implemented using standard logic elements. One suitable form of digital attenuator is described in U.S. Pat. No. 4,021,652 issued May 3, 1977 and invented by Ernst A. Munter.

In addition to the alternate circuit configurations shown in the drawing obtained by actuating the switch 28, a third configuration can be realized by placing the attenuator rods 19 in the transmit legs 13 rather than the receive legs 14 of the four-wire path. With this configuration the serial-to-parallel converter 20 must be connected prior to the input to the pad 19 otherwise the circuit will tend to insert the attenuation in the talking rather than the listening path except under very strong signal conditions. In addition the output of the comparator 22 must be inverted so that the pads 19 are inserted in the transmit path 13 only when the signal on the receive path 14 is stronger. This configuration also has the added disadvantage that in a mixed network, the levels on the analog facilities would be 6dB lower when the pads are in, thereby decreasing the signal-to-noise ratio.

What is claimed is:

1. In a telephone system having a two-wire analog transmission path coupled to a four-wire digital transmission path via a hybrid network interposed A/D and D/A converters in the four-wire path;
   a voice controlled digital echo attenuation circuit comprising:
   a comparator for comparing a sample of $n$-bits of each $m$-bit encoded word of tramsmit and receive pulse code modulated signals in the four-wire path to derive an output signal having a first or a second characteristic when the transmitted signal code is respectively not less than or less than the received signal code;
   a L-bit up/down counter, having a maximum non-overflow store of $(2^L - 1)$ that is incremented or decremented by said output signal of the first or of the second characteristic respectively;
   a digital attenuator responsive to the output of the up/down counter for attenuating the receive pulse code modulated signal in the four-wire path wherein said output is generated only when the store in the counter is at least $2^{(L-1)}$.

2. A voice controlled digital echo attenuation circuit as defined in claim 1 in which the digital signals in the four-wire path are serial, and are coupled in parallel to the comparator via serial-parallel converters.

3. A voice controlled digital echo attenuation circuit as defined in claim 2 in which $n = 4$, $m = 7$, $L = 8$; the output signal from the comparator increments or decrements the up/down counter by 1; and the attenuation of the digital signal through the digital attenuator is about 6dB.

4. A voice controlled digital echo attenuation circuit as defined in claim 1 in which the digital signal from the attenuator when selected in the receive path, is coupled to the comparator.

5. A voice controlled digital echo attenuation circuit as defined in claim 1 in which the digital signal to the attenuator in the receive path is coupled to the comparator.

6. A digital echo attenuation circuit for a telephone system comprising:
   a comparator for comparing at least some of the most significant bits of each of the digitally encoded samples of transmitted and received signals from a telephone station to derive an output signal having a first or a second characteristic when the transmitted signal sample is respectively not less than or less than the received signal sample;
   an up/down counter, having a non-overflow store that is incremented or decremented in response to said first or second characteristics, respectively, of the output signal; and
   a digital attenuator responsive to the output of the up/down counter for attenuating the received signals wherein said output is generated only when the number stored in the counter exceeds a preselected count.

7. A digital echo attenuation circuit for a telephone system comprising:
   a comparator for comparing at least some of the most significant bits $x$ and $y$ of each of the digitally encoded samples of transmit signals and receive signals from a telephone station respectively, to derive an output:

$$(|x| - |y|) = 1 \text{ if } x \geq y$$

$$(|x| - |y|) = 0 \text{ if } x < y$$

an L-bit accumulator having an accumulated store $0 < A < (2^L - 1)$, and a present value:

where: $A_n = A_{(n-1)} + 2(|x| - |y|) - 1$
   $A_n$ = present value of accumulator,
   $A_{(n-1)}$ = past value of accumulator; and a digital attenuator responsive to the output of the accumulator for attenuating the receive signals wherein said output is generated when the store in the accumulator is at least $2^{(L-1)}$.

8. A digital echo attenuation circuit for a telephone system comprising:
   a comparator for comparing at least some of the most significant bits of each of the digitally encoded samples of transmitted and received signals from a telephone station to derive an output signal having a first or a second characteristic when the received signal sample is respectively not less than or less than the transmitted signal sample;
   an up/down counter, having a non-overflow store that is incremented or decremented in response to said first or second characteristics, respectively, of the output signal; and
   a digital attenuator responsive to the output of the up/down counter for attenuating the transmitted signals wherein said output is generated only when the number stored in the counter exceeds a preselected count.

* * * * *